United States Patent
Liu et al.

(10) Patent No.: US 10,924,409 B2
(45) Date of Patent: Feb. 16, 2021

(54) METHOD FOR IMPLEMENTING LOAD BALANCING, APPARATUS, AND NETWORK SYSTEM

(71) Applicant: Huawei Technologies Co., Ltd., Shenzhen (CN)

(72) Inventors: Heyang Liu, Nanjing (CN); Qinghua Yan, Beijing (CN); Li Shen, Nanjing (CN); Meiling Sun, Nanjing (CN); Zhiyu Xie, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 25 days.

(21) Appl. No.: 15/971,443

(22) Filed: May 4, 2018

(65) Prior Publication Data
US 2018/0324097 A1    Nov. 8, 2018

(30) Foreign Application Priority Data
May 5, 2017  (CN) .......................... 201710312467.3

(51) Int. Cl.
*H04L 12/803* (2013.01)
*H04L 12/701* (2013.01)
(Continued)

(52) U.S. Cl.
CPC ............ *H04L 47/125* (2013.01); *H04L 45/00* (2013.01); *H04L 45/745* (2013.01); *H04L 49/25* (2013.01)

(58) Field of Classification Search
CPC ..... H04L 47/125; H04L 45/745; H04L 49/25; H04L 45/00
See application file for complete search history.

(56) References Cited

U.S. PATENT DOCUMENTS

2003/0002503 A1* 1/2003 Brewer .................. H04L 47/10
370/392
2003/0172188 A1* 9/2003 Hasegawa ........... H04L 12/4625
370/401
(Continued)

FOREIGN PATENT DOCUMENTS

CN          105981330 A     9/2016
JP          2012169733 A    9/2012
(Continued)

OTHER PUBLICATIONS

Machine Translation and Abstract of Japanese Publication No. JP2012175198, Sep. 10, 2012, 20 pages.
(Continued)

*Primary Examiner* — Gregory B Sefcheck
*Assistant Examiner* — Joshua Smith
(74) *Attorney, Agent, or Firm* — Conley Rose, P.C.

(57) ABSTRACT

A method for implementing load balancing, an apparatus, and a network system, where a controller obtains a port attribute of each port of a first switch in a mesh network, determines, according to the port attribute of each port of the first switch, a virtual routing and forwarding instance corresponding to each port of the first switch, where all user-side ports of the first switch correspond to a first virtual routing and forwarding instance, generates a forwarding table of the first switch according to a topology of the mesh network and the virtual routing and forwarding instance corresponding to each port of the first switch, where a first forwarding entry of the forwarding table includes the first virtual routing and forwarding instance, a destination network segment and at least two forwarding paths corresponding to the destination network segment, and sends the forwarding table to the first switch.

20 Claims, 10 Drawing Sheets

(51) Int. Cl.
*H04L 12/741* (2013.01)
*H04L 12/947* (2013.01)

(56) References Cited

U.S. PATENT DOCUMENTS

| | | |
|---|---|---|
| 2009/0307334 A1 | 12/2009 | Maltz et al. |
| 2012/0207026 A1 | 8/2012 | Sato |
| 2014/0307553 A1* | 10/2014 | Fung .................. H04L 47/125 370/235 |
| 2015/0043378 A1* | 2/2015 | Bardgett ............ H04L 12/4641 370/254 |
| 2015/0180801 A1 | 6/2015 | Casado et al. |
| 2015/0207724 A1* | 7/2015 | Choudhury ............ H04L 41/12 370/255 |
| 2015/0281073 A1 | 10/2015 | Kotha et al. |
| 2015/0349978 A1 | 12/2015 | Wu et al. |
| 2016/0285769 A1 | 9/2016 | Qiang |

FOREIGN PATENT DOCUMENTS

| | | | |
|---|---|---|---|
| JP | 2012175198 A | 9/2012 | |
| JP | 2012525017 A | 10/2012 | |

OTHER PUBLICATIONS

Foreign Communication From a Counterpart Application, European Application No. 18170843.9, Extended European Search Report dated Sep. 27, 2018, 7 pages.

\* cited by examiner

| Source network segment | Destination network segment | Path | S1 route entry | S2 route entry | S3 route entry |
|---|---|---|---|---|---|
| Segment 1 | Segment 2 | S1 –> S2 | VRF 1, segment 2, S2, S1.2 | | |
| | | S1 –> S3 –> S2 | VRF 1, segment 2, S3, S1.3 | | VRF 2, segment 2, S2, S3.2 |
| Segment 1 | Segment 3 | S1 –> S3 | VRF 1, segment 3, S3, S1.3 | | |
| | | S1 –> S2 –> S3 | VRF 1, segment 3, S2, S1.2 | VRF 2, segment 3, S3, S2.3 | |
| Segment 2 | Segment 1 | S2 –> S1 | | VRF 1, segment 1, S1, S2.1 | |
| | | S2 –> S3 –> S1 | | VRF 1, segment 1, S3, S2.3 | VRF 2, segment 1, S1, S3.1 |
| Segment 2 | Segment 3 | S2 –> S3 | | VRF 1, segment 3, S3, S2.3 | |
| | | S2 –> S1 –> S3 | VRF 2, segment 3, S3, S1.3 | VRF 1, segment 3, S1, S2.1 | |
| Segment 3 | Segment 1 | S3 –> S1 | | | VRF 1, segment 1, S1, S3.1 |
| | | S3 –> S2 –> S1 | | VRF 2, segment 1, S1, S2.1 | VRF 1, segment 1, S2, S3.2 |
| Segment 3 | Segment 2 | S3 –> S2 | | | VRF 1, segment 2, S2, S3.2 |
| | | S3 –> S1 –> S2 | VRF 2, segment 2, S2, S1.2 | | VRF 1, segment 2, S1, S3.1 |

FIG. 9A

| VRF | Destination network segment | Next hop | Egress port |
|---|---|---|---|
| 1 | Segment 2 | S3 | S1.3 |
| | | S2 | S1.2 |
| | segment 3 | S3 | S1.3 |
| | | S2 | S1.2 |
| 2 | segment 2 | S2 | S1.2 |
| | segment 3 | S3 | S1.3 |

FIG. 9B

| VRF | Destination network segment | Next hop | Egress port |
|---|---|---|---|
| 1 | Segment 1 | S1 | S2.1 |
| | | S3 | S2.3 |
| | Segment 3 | S3 | S2.3 |
| | | S1 | S2.1 |
| 2 | Segment 1 | S1 | S2.1 |
| | Segment 3 | S3 | S2.3 |

FIG. 9C

| VRF | Destination network segment | Next hop | Egress port |
|---|---|---|---|
| 1 | Segment 1 | S1 | S3.1 |
| | | S2 | S3.2 |
| | Segment 2 | S2 | S3.2 |
| | | S1 | S3.1 |
| 2 | Segment 1 | S2 | S3.2 |
| | Segment 2 | S1 | S3.1 |

FIG. 9D

| VRF | Destination network segment | Next hop | Egress port |
|---|---|---|---|
| 3 | Segment b | S12 | S11.12 |
| | | S21 | S11.21 |
| | | S13 | S11.13 |
| | | S31 | S11.31 |

FIG. 10A

| VRF | Destination network segment | Next hop | Egress port |
|---|---|---|---|
| 4 | Segment b | S22 | S12.22 |

FIG. 10B

| VRF | Destination network segment | Next hop | Egress port |
|---|---|---|---|
| 5 | Segment b | S22 | S21.22 |

FIG. 10C

| VRF | Destination network segment | Next hop | Egress port |
|---|---|---|---|
| 4 | Segment b | S13 | S13.23 |

FIG. 10D

| VRF | Destination network segment | Next hop | Egress port |
|---|---|---|---|
| 4 | Segment b | S23 | S23.22 |

FIG. 10E

| VRF | Destination network segment | Next hop | Egress port |
|---|---|---|---|
| 5 | Segment b | S31 | S31.32 |

| VRF | Destination network segment | Next hop | Egress port |
|---|---|---|---|
| 4 | Segment b | S32 | S32.22 |

METHOD FOR IMPLEMENTING LOAD BALANCING, APPARATUS, AND NETWORK SYSTEM

CROSS-REFERENCE TO RELATED APPLICATION

This application claims priority to Chinese Patent Application No. 201710312467.3 filed on May 5, 2017, which is hereby incorporated by reference in its entirety.

TECHNICAL FIELD

This application relates to network communications technologies, and in particular, to a method for implementing load balancing, an apparatus, and a network system.

BACKGROUND

In the cloud computing era, network data traffic models greatly change. 16% of data traffic is born on a carrier network, 14% of data traffic is born on an enterprise network, and the remaining 70% of data traffic all flows in a data center network. Exponential growth of the data traffic and bandwidth of the data center network has greatly stretched people's imagination of a traditional network. High bandwidth and high scalability have become primary requirements of customers of the data center network. A data center network construction bottleneck is becoming obvious.

To overcome the foregoing problems, other approaches provide a scalable data center network, which is referred to as a mesh network. The mesh network is a fully-connected network in which all switches are connected to each other. The mesh network may also be a level-1 mesh network, a level-2 mesh network, or a multiple-level mesh network. At least one direct path (that is, a path without an intermediate switch) exists between one switch in the level-1 mesh network and any other switch in the level-1 mesh network. FIG. 1 is a schematic diagram of a structure of a level-1 mesh network. The level-1 mesh network includes multiple switches (FIG. 1 shows a total of eight switches S1, S2, S3, S4, S5, S6, S7 and S8). Each switch is interconnected to any other switch. Multiple level-1 mesh networks are interconnected to obtain a level-2 mesh network. FIG. 2 is a 4×4 level-2 mesh network. The 4×4 level-2 mesh network is a level-2 mesh network formed by four level-1 mesh networks. Each level-1 mesh network that forms the level-2 mesh network includes four switches (represented by black dots). FIG. 2 is merely used as an example. In practice, the multiple level-1 mesh networks included in a level-2 mesh network may have a same quantity or different quantities of switches. In a level-2 mesh network scenario, for any level-1 mesh network, a switch in the level-1 mesh network may be referred to as an intra-group device of the level-1 mesh network, and a switch that belongs to another level-1 mesh network is referred to as an inter-group device of the level-1 mesh network.

In a mesh network, there are actually multiple paths between one switch and another switch. The level-1 mesh network in FIG. 1 is used as an example. Paths between S1 and S5 optionally include S1→S5, S1→S2→S5, S1→S3→S5, S1→S2→S3→S5, and so on. The paths have different quantities of hops and different overheads, and therefore are referred to as unequal-cost paths. Usually, a packet from a first switch in the mesh network to a second switch is forwarded only through the shortest path between the first switch and the second switch. As a result, the shortest path between the first switch and the second switch has relatively high load, and other paths between the first switch and the second switch cannot be fully utilized. To implement load balancing among multiple unequal-cost paths, a shortest path first rule restriction needs to be removed. In this case, because all switches in the mesh network are fully connected and each entry in a forwarding table includes only a destination network segment, a next hop, and a port, a switch that receives a packet in the mesh network randomly selects a forwarding path for the packet according to the forwarding table. The packet may be constantly forwarded by a source switch of the packet (that is, a switch connected to a server that sends the packet) until time to live (TTL) of the packet is 0 and the packet is discarded. It can be learned that only removing the shortest path first rule restriction cannot implement load balancing in the mesh network.

SUMMARY

Embodiment of this application provides a method for implementing load balancing, an apparatus, and a network system in order to improve load balancing in a mesh network.

A first aspect of this application provides a method for implementing load balancing. The method is applied to a system that includes a controller and a mesh network. The mesh network includes multiple switches. The method is executed by the controller. The controller obtains a port attribute of each port of a first switch, the first switch is any switch in the mesh network, and the port attribute is used to indicate that the port is a user-side port or a network-side port. The controller determines, according to the port attribute of each port of the first switch, a virtual routing and forwarding instance corresponding to each port of the first switch. Ta user-side port and a network-side port correspond to different virtual routing and forwarding instances, and all user-side ports of the first switch correspond to a first virtual routing and forwarding instance. The controller generates a forwarding table of the first switch according to a topology of the mesh network and the virtual routing and forwarding instance corresponding to each port of the first switch. A first forwarding entry of the forwarding table includes the first virtual routing and forwarding instance, a first destination network segment corresponding to the first virtual routing and forwarding instance and at least two forwarding paths corresponding to the first destination network segment. The controller sends the forwarding table to the first switch. The forwarding table is used to enable the first switch to select, according to a load balancing algorithm and the first forwarding entry and from the at least two forwarding paths corresponding to the first destination network segment, a target forwarding path for a packet corresponding to the first destination network segment.

The port of the switch in this application refers to a service port through which the switch is connected to another device. A service port through which the switch is not connected to any device is not considered. A mesh network contains a large quantity of unequal-cost paths. Therefore, a shortest path first rule restriction needs to be removed to implement load balancing in the mesh network. Removing shortest path first rule restriction indicates that multiple unequal-cost paths, instead of a shortest path, are selected for a pair of a source network segment and a destination network segment according to a shortest path first rule in a process of generating the forwarding table by the first switch.

In the first aspect, the controller obtains the port attribute of each port of the first switch, enables all user-side ports of the first switch to correspond to the first virtual routing and forwarding instance, and generates the forwarding table of the first switch according to the topology of the mesh network and the virtual routing and forwarding instance corresponding to each port of the first switch. Each entry of the forwarding table includes a virtual routing and forwarding instance. Because the forwarding entry includes the virtual routing and forwarding instance, and user-side port and the network-side port correspond to different virtual routing and forwarding instances, after receiving a packet, the first switch searches the forwarding table according to a port attribute of a port that receives the packet. This can avoid sending a packet received from a user-side port back to the user-side port and can ensure that the packet can be correctly forwarded. In addition, the destination network segment in the forwarding entry related to the first virtual routing and forwarding instance corresponds to the at least two forwarding paths. Therefore, after receiving a packet sent by a server, the first switch may select one forwarding path from the at least two forwarding paths according to the load balancing algorithm and implement load balancing between the at least two forwarding paths.

In a first implementation of the first aspect, when obtaining the port attribute of each port of the first switch, the controller sends a notification message to the first switch. The notification message is used to instruct the first switch to send a discovery message from all ports of the first switch, and the discovery message is used to instruct a device that receives the discovery message to send a report message to the controller. The controller determines the port attribute of each port of the first switch based on whether the device connected to the first switch sends the report message.

With reference to the first implementation of the first aspect, in a second implementation of the first aspect, when determining the port attribute of each port of the first switch based on whether a device connected to each port of the first switch sends a report message, the controller receives the report message. The report message includes a type of the device that sends the report message and an identifier of a port through which the first switch sends the discovery message to the device. The controller determines the type of the device, and determines a port through which the first switch sends the discovery message to the other switch as a network-side port if the device is another switch, or determines a port through which the first switch sends the discovery message to the server as a user-side port if the device is a server.

With reference to the second implementation of the first aspect, in a third implementation of the first aspect, after sending the notification message to the first switch, the controller determines a port that is on the first switch and that is not reported within a specified time period as a user-side port.

With reference to the third implementation of the first aspect, in a fourth implementation of the first aspect, the mesh network is a level-2 mesh network, and when determining the port through which the first switch sends the discovery message to the other switch as a network-side port, if the first switch and the other switch belong to a same switch group, the controller determines the port through which the first switch sends the discovery message to the other switch as an intra-group port, or determines the port through which the first switch sends the discovery message to the other switch as an inter-group port if the first switch and the other switch belong to different switch groups.

The first to the fourth implementations allow the controller to learn in time of a port attribute of each port of a switch connected to the mesh network.

With reference to the fourth implementation of the first aspect, in a fifth implementation of the first aspect, all intra-group ports of the first switch correspond to a second virtual routing and forwarding instance. A forwarding entry, in the forwarding table, corresponding to the second virtual routing and forwarding instance includes the second virtual routing and forwarding instance, a destination network segment, and at least one forwarding path corresponding to the destination network segment. All inter-group ports of the first switch correspond to a third virtual routing and forwarding instance. A forwarding entry, in the forwarding table, corresponding to the third virtual routing and forwarding instance includes the third virtual routing and forwarding instance, a destination network segment, and at least one forwarding path corresponding to the destination network segment.

According to the fifth implementation, ports of the switch are divided into three types (in a level-2 mesh network scenario), a user-side port, an intra-group port, and an inter-group port. All the user-side ports correspond to the first virtual routing and forwarding instance, all the intra-group ports correspond to the second virtual routing and forwarding instance, and all the inter-group ports correspond to the third virtual routing and forwarding instance. The controller generates the forwarding table for the first switch based on the first virtual routing and forwarding instance, the second virtual routing and forwarding instance, and the third virtual routing and forwarding instance, and does not need to use each port of the first switch as a source port to generate the forwarding table. This can prevent the packet from being forwarded to the port that receives the packet, reduce entries in the forwarding table, and therefore save storage resources of the first switch.

With reference to the first aspect and any one of the first to the fifth implementations of the first aspect, in a sixth implementation of the first aspect, when generating the forwarding table of the first switch according to the topology of the mesh network and the virtual routing and forwarding instance corresponding to each port of the first switch, the controller obtains a network segment configured for each of the multiple switches to obtain multiple network segments, and determines a source network segment and a destination network segment in the multiple network segments. The source network segment is any one of the multiple network segments, and the destination network segment is any one of the multiple network segments except the source network segment. The controller determines, according to the topology of the mesh network, N forwarding paths from the source network segment to the destination network segment, and generates a route entry corresponding to an $i^{th}$ forwarding path for each switch other than a destination switch on the $i^{th}$ forwarding path in the N forwarding paths, where i is a natural number less than or equal to N. Each route entry includes a virtual routing and forwarding instance, a destination network segment, a next hop, and an egress port. The controller determines, according to all route entries of the first switch, a forwarding path corresponding to each destination network segment of the first switch in each virtual routing and forwarding instance, to generate the forwarding table of the first switch.

According to the sixth implementation, the controller may dynamically generate a forwarding table for each switch. This can avoid a manual forwarding table configuration error, and improve processing efficiency.

A second aspect of this application provides another method for implementing load balancing. The method is applied to a system that includes a controller and a mesh network. The mesh network includes multiple switches. The method is executed by a first switch. The first switch is any one of the multiple switches, the first switch includes multiple ports, and the multiple ports include a network-side port and a user-side port. The first switch receives a forwarding table sent by the controller. A first forwarding entry of the forwarding table includes a first virtual routing and forwarding instance, a first destination network segment corresponding to the first virtual routing and forwarding instance and at least two forwarding paths corresponding to the first destination network segment. The first virtual routing and forwarding instance is a virtual routing and forwarding instance corresponding to all user-side ports of the first switch. The first switch receives a packet. When a port that receives the packet is a user-side port, and the packet is a packet corresponding to the first destination network segment, the first switch selects, according to a load balancing algorithm and the first forwarding entry, a target forwarding path for the packet from the at least two forwarding paths corresponding to the first destination network segment, and forwards the packet using the target forwarding path.

According to the method in the second aspect of this application, the first switch receives, from the controller, the forwarding table generated for the first switch. Different from a conventional forwarding table, each entry of the forwarding table not only includes a destination network segment, a next hop, and an egress port, but also includes a virtual routing and forwarding instance. The virtual routing and forwarding instance is used to indicate a port attribute of the port that receives the packet. When the virtual routing and forwarding instance is the first virtual routing and forwarding instance that indicates the user-side port, the forwarding entry includes at least two forwarding paths. When receiving the packet from the user-side port, the first switch verifies the first virtual routing and forwarding instance corresponding to the user-side port, searches the forwarding table according to the first virtual routing and forwarding instance and the destination network segment corresponding to the packet (that is, a network segment to which a destination Internet Protocol (IP) address of the packet belongs), and selects, according to the load balancing algorithm and from the found at least two forwarding paths, a forwarding path to send the packet. When generating the forwarding table, the controller separates forwarding entries using different virtual routing and forwarding instances to avoid sending the packet back to the port that receives the packet. Therefore, the method can implement load balancing in the mesh network.

With reference to the second aspect, in a first implementation of the second aspect, before receiving the forwarding table sent by the controller, the first switch further receives a notification message sent by the controller, and sends a discovery message from all ports of the first switch according to the notification message. The discovery message is used to instruct a device that receives the discovery message to send a report message to the controller.

With reference to the first implementation of the second aspect, in a second implementation of the second aspect, the first switch further receives a second discovery message sent by a second switch. The second discovery message includes an identifier of the second switch and an identifier of a port through which the second switch sends the second discovery message to the first switch. The first switch sends a second report message to the controller according to the second discovery message. The second report message includes the identifier of the port through which the second switch sends the second discovery message to the first switch such that the controller determines a port attribute of the port through which the second switch sends the second discovery message to the first switch.

The first implementation and the second implementation of the second aspect allow the controller to obtain in time a port attribute of each port of a switch connected to the mesh network, and generate a forwarding table for the switch.

With reference to the second aspect and either the first implementation or the second implementation of the second aspect, in a third implementation of the second aspect, the network-side port includes an intra-group port and an inter-group port. All intra-group ports of the first switch correspond to a second virtual routing and forwarding instance. A forwarding entry, in the forwarding table, corresponding to the second virtual routing and forwarding instance includes the second virtual routing and forwarding instance, a destination network segment, and at least one forwarding path corresponding to the destination network segment. All inter-group ports of the first switch correspond to a third virtual routing and forwarding instance. A forwarding entry, in the forwarding table, corresponding to the third virtual routing and forwarding instance includes the third virtual routing and forwarding instance, a destination network segment, and at least one forwarding path corresponding to the destination network segment.

According to the third implementation, ports of the switch are divided into three types (in a level-2 mesh network scenario), a user-side port, an intra-group port, and an inter-group port. All the user-side ports correspond to the first virtual routing and forwarding instance, all the intra-group ports correspond to the second virtual routing and forwarding instance, and all the inter-group ports correspond to the third virtual routing and forwarding instance. The controller generates the forwarding table for the first switch based on the first virtual routing and forwarding instance, the second virtual routing and forwarding instance, and the third virtual routing and forwarding instance, and does not need to use each port of the first switch as a source port to generate the forwarding table. This can prevent the packet from being forwarded to the port that receives the packet, reduce entries in the forwarding table, and therefore save storage resources of the first switch.

A third aspect of this application provides a controller. The controller includes multiple function units, and the multiple function units cooperate with each other to complete the method in the first aspect and the implementations of the first aspect.

A fourth aspect of this application provides a switch. The switch includes multiple function units, and the multiple function units cooperate with each other to complete the method in the second aspect and the implementations of the second aspect.

A fifth aspect of this application provides a network system. The network system includes a controller and a mesh network. The mesh network includes multiple switches, each of the multiple switches includes multiple ports, and the multiple ports include a user-side port and a network-side port. The controller is the controller according to the third aspect, and any one of the multiple switches is the switch according to the fourth aspect.

A sixth aspect of this application provides a storage medium. The storage medium stores a program, and when the program is run by a computing device, the computing device executes the method for implementing load balancing provided in the first aspect or any one implementation of the first aspect. The storage medium includes but is not limited to a read-only memory (ROM), a random access memory (RAM), a flash memory, a hard disk drive (HDD), or a solid state drive (SSD).

A seventh aspect of this application provides a computer program product. The computer program product includes a program instruction. When the computer program product is executed by a controller, the controller executes the method for implementing load balancing provided in the first aspect or any one implementation of the first aspect. The computer program product may be a software installation package. When the method for implementing load balancing provided in the first aspect or any one implementation of the first aspect needs to be used, the computer program product may be downloaded and executed on the controller.

An eighth aspect of this application provides a storage medium. The storage medium stores a program, and when the program is run by a computing device, the computing device executes the method for implementing load balancing provided in the second aspect or any one implementation of the second aspect. The storage medium includes but is not limited to a read-only memory, a random access memory, a flash memory, an HDD, or an SSD.

A ninth aspect of this application provides a computer program product. The computer program product includes a program instruction. When the computer program product is executed by a switch, the switch executes the method for implementing load balancing provided in the second aspect or any one implementation of the second aspect. The computer program product may be a software installation package. When the method for implementing load balancing provided in the second aspect or any one implementation of the second aspect needs to be used, the computer program product may be downloaded and executed on the switch.

For beneficial effects of solutions from the third aspect to the ninth aspect of this application, refer to the methods in the first aspect and the second aspect.

BRIEF DESCRIPTION OF DRAWINGS

To describe the technical solutions in the embodiments of this application more clearly, the following briefly describes the accompanying drawings required for describing the embodiments.

FIG. 9A shows all route entries generated by a controller in a scenario shown in FIG. 4;

FIGS. 9B, 9C and 9D show forwarding tables separately generated by a controller for switches S1, S2, and S3 according to FIG. 9A;

FIGS. 10A, 10B, 10C, 10D, 10E, 10F and 10G show forwarding entries separately generated by a controller for switches S11, S12, S21, S13, S23, S31, and S32 in a scenario shown in FIG. 5;

FIG. 11 is a schematic diagram of a structure of a controller according to an embodiment of this application;

DESCRIPTION OF EMBODIMENTS

The following describes technical solutions of embodiments in this application with reference to accompanying drawings.

In all embodiments and their specific implementations in this application, the terms "first," "second," "third" and so on are intended to distinguish between different objects of a same type but do not limit a specific order or sequence. In all embodiments and their specific implementations in this application, a port that connects one switch in a mesh network to another switch is referred to as a network-side port, and a port that connects the switch to a server is referred to as a user-side port. The network-side port may be an intra-group port or an inter-group port. A port that connects to another switch in a same switch group is referred to as an intra-group port. A port that connects to another port in a different switch group is referred to as an inter-group port.

Figure 1:
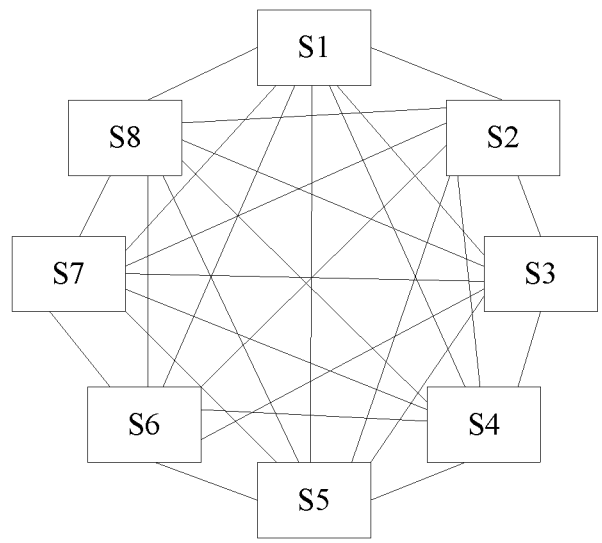
FIG. 1 is a schematic diagram of a structure of a level-1 mesh network.
Figure 2:
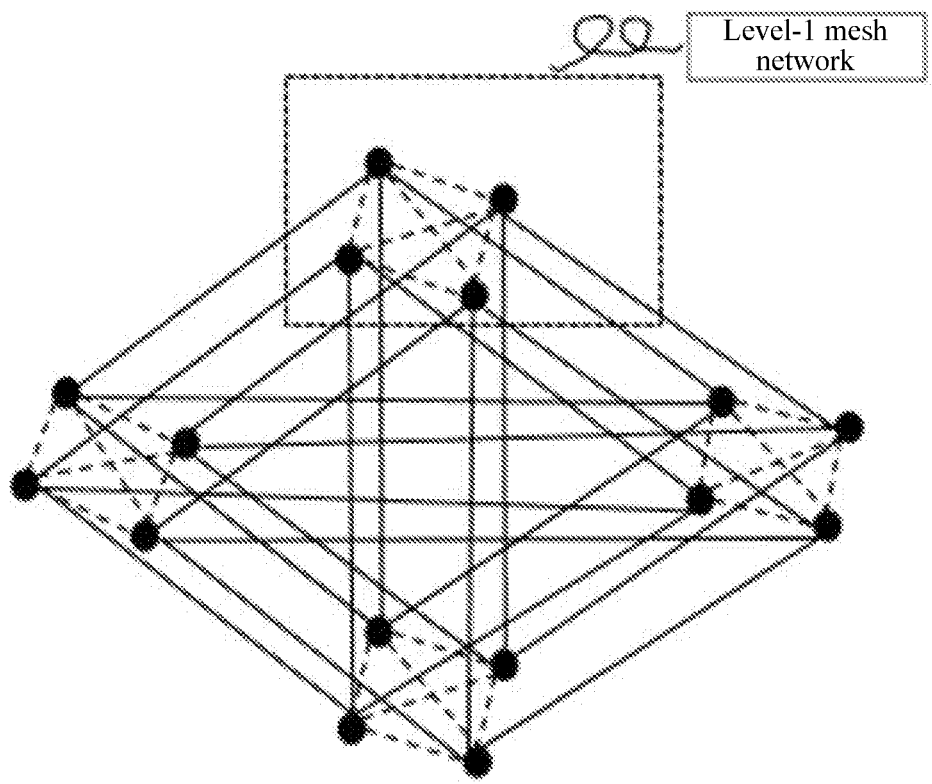
FIG. 2 is a schematic diagram of a structure of a level-2 mesh network.
Figure 3:
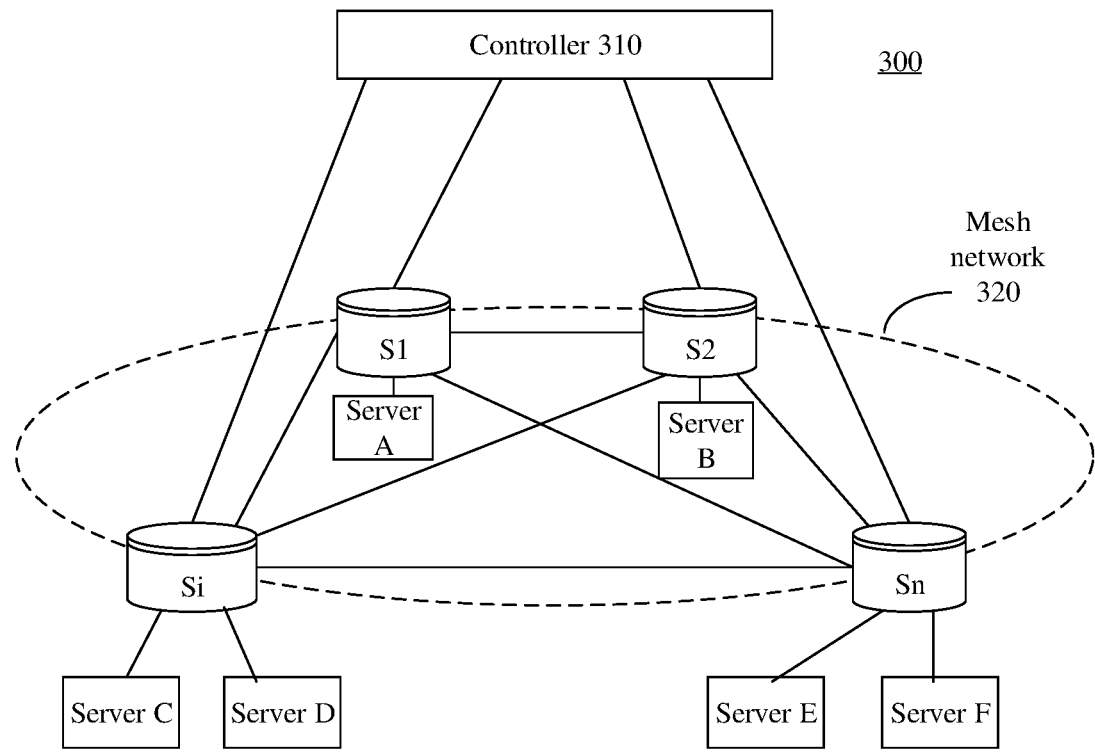
FIG. 3 is a schematic diagram of a structure of a network system according to an embodiment of this application.

FIG. 3 is a schematic diagram of a structure of a network system 300 according to an embodiment of this application. The network system includes a controller 310 and a mesh network 320. The mesh network 320 includes switches S1-Sn, and S1-Sn indicate that there are n switches, where n is greater than or equal to 3. FIG. 3 shows four switches S1, S2, Si, and Sn. The controller 310 is communicatively connected to each of the multiple switches S1-Sn. Each of the multiple switches S1-Sn is communicatively connected to at least one server. For example, S1 is connected to a server A, S2 is connected to a server B, Si is connected to servers C and D, and Sn is connected to servers E and F.

Each switch is connected to the controller 310 through a control port (also referred to as a management port), and is connected to different switches or servers through different service ports. This application does not include a special operation on the control port, but includes processing only related to the service port. For brevity, this application use "port" to indicate "service port." That is, the "port" mentioned in both this specification and claims is a service port of a switch. Further, when a port of a switch is not connected to any device, an operation based on the port is meaningless. Therefore, the "port" mentioned in both the following embodiments of this application and the claims is a port connected to another device.

Figure 4:
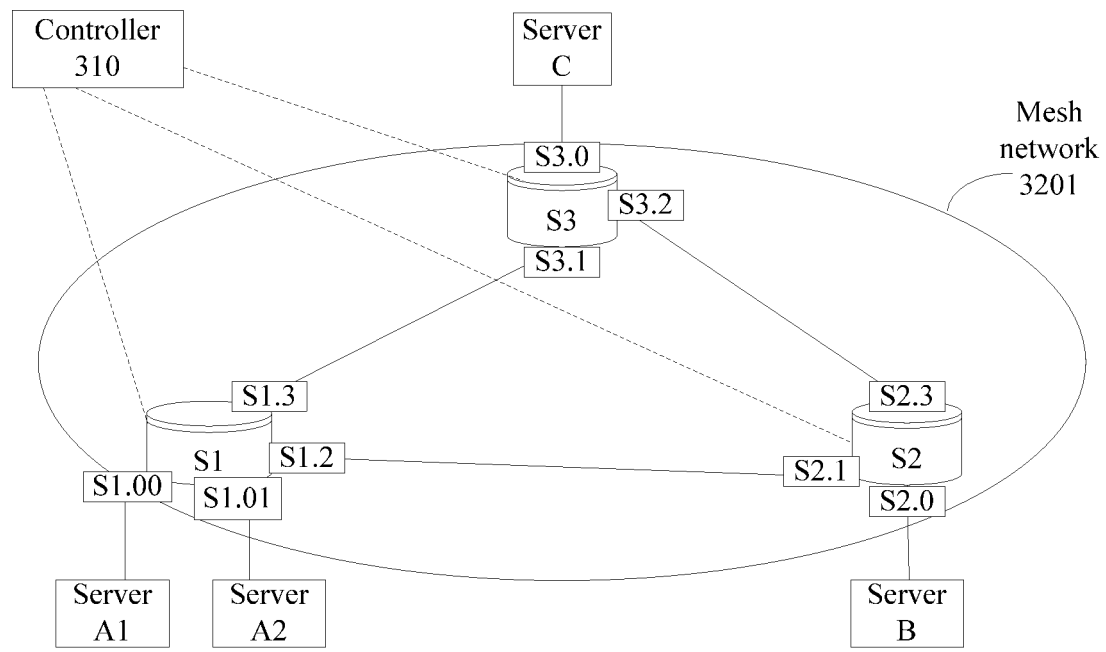
FIG. 4 is a specific implementation of the network system shown in FIG. 3.

In one implementation, the mesh network 320 is a level-1 mesh network. FIG. 4 shows an example in which the mesh network 320 is a level-1 mesh network 3201 including three switches S1, S2, and S3. During networking, the level-1 mesh network 3201 may include more than three switches.

Figure 5:
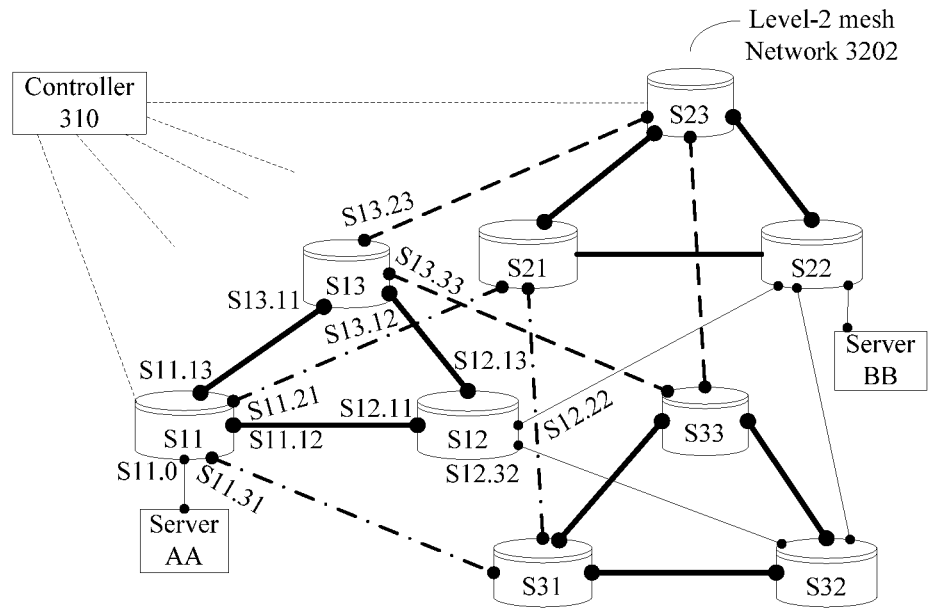
FIG. 5 is another specific implementation of the network system shown in FIG. 3.

In another implementation, the mesh network 320 is a level-2 mesh network including two or more level-1 mesh networks. Each level-1 mesh network includes at least three switches. FIG. 5 shows an example in which the mesh network 320 is a level-2 mesh network 3202 including three level-1 mesh networks. Each switch in the mesh network 3202 is allocated a number Sij, where i is a switch group to which the switch belongs, and j is a number of the switch in the switch group to which the switch belongs. For example, S12 is a second switch in a switch group 1. Each level-1 mesh network in FIG. 5 includes three switches, and the three switches in each level-1 mesh network form one switch group. A connection between switches in each switch group is indicated by a thick solid line. Further, switches S11, S12, and S13 form a first switch group, switches S21, S22, and S23 form a second switch group, and switches S31, S32, and S33 form a third switch group. A switch in each switch group is connected to a corresponding switch in another switch group. One switch corresponding to another switch indicates that the two switches have a same number in their respective switch groups, or a correspondence is preconfigured for the two switches. For example, in FIG. 5, the switch S11 is connected to the switches S21 and S31, the switch S12 is connected to the switches S22 and S32, the switch S13 is connected to the switches S23 and S33 to form the level-2 mesh network 3202. Each switch may be connected to one or more servers. During actual networking, the level-2 mesh network 3202 may include two or more than three switch groups. Each switch group may include two or more than three switches. The network shown in FIG. 5 is only an example. During actual deployment, when a mesh network includes multiple switch groups, and a first switch group in the multiple switch groups includes more switches than a second switch group, at least one switch in the first switch group does not have a corresponding switch in the second switch group. It is assumed that a switch A in the first switch group does not have a corresponding switch in the second switch group. The switch A communicates with a switch in the second switch group using another switch that is in the first switch group and that has a corresponding switch in the second switch group.

Each switch in the mesh network shown in FIG. 4 or FIG. 5 includes multiple ports used for communication with a server or another switch. In addition, a number is allocated to each port of each switch in this application.

If the mesh network 320 is the level-1 mesh network 3201 in FIG. 4, a port number of a switch is SX.Y, where S indicates the switch, X indicates a number of the switch, and Y is a number of a port of the switch. In one implementation, a number of a port connected to a server (that is, a user-side port) is set to 0 (connected to only one server), or set to a number starting with 0 (connected to multiple servers), and a number of a port connected to another switch (that is, a network-side port) is set to a number of the other switch. As shown in FIG. 4, the switch S1 communicates with a server A1 through a port S1.00, communicates with a server A2 through a port S1.01, communicates with the switch S2 through a port S1.2, and communicates with the switch S3 through a port S1.3. The switch S2 communicates with a server B through a port S2.0, communicates with the switch S1 through a port S2.1, and communicates with the switch S3 through a port S2.3. The switch S3 communicates with a server C through a port S3.0, communicates with the switch S1 through a port S3.1, and communicates with the switch S2 through a port S3.2.

If the mesh network 320 is the level-2 mesh network 3202 in FIG. 5, a port number of a switch is Sij.XY, where S indicates the switch, ij indicates a number of the switch, and XY is a number of a port of the switch. In one implementation, a number of a port connected to a server is set to 0 (connected to only one server), or set to a number starting with 0 (connected to multiple servers), and a number of a port connected to another switch is set to a number of the other switch, to represent a correspondence between the two switches. For example, a little black dot is used to represent each port in FIG. 5. Because there are a large quantity of ports, FIG. 5 only shows numbers of ports of the switches S11, S12, and S13 in the first switch group. A port through which the switch S11 is connected to the switch S12 is numbered S11.12, a port through which the switch S13 is connected to the switch S23 is numbered S13.23, and other ports are numbered in a similar way. In FIG. 5, each switch has both intra-group ports, and inter-group ports. For example, the port S11.12 of the switch S11 is an intra-group port, a port S11.21 is an inter-group port, and a port S11.0 is a user-side port.

The foregoing numbering manner is provided only for description of this embodiment in this application, a person skilled in the art may design another numbering manner of switches and ports of the switches. For example, all ports of a switch are numbered in sequence. This is not limited in this embodiment of this application.

Figure 6:
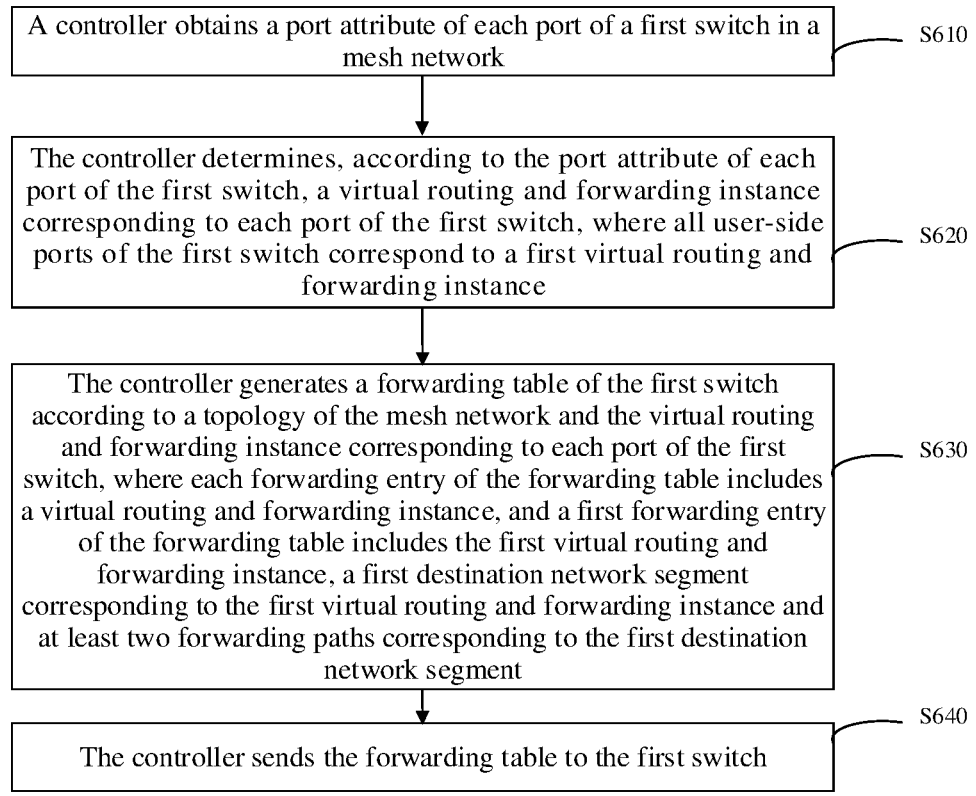
FIG. 6 is a schematic flowchart of a method for generating a forwarding table according to an embodiment of this application.

Based on the network system in any one of FIG. 3 to FIG. 5, an embodiment of this application provides a method for implementing load balancing shown in FIG. 6.

Step S610. A controller obtains a port attribute of each port of a first switch in a mesh network.

The first switch is any switch in the mesh network, and the port attribute is used to indicate that the port is a user-side port or a network-side port.

Step S620. The controller determines, according to the port attribute of each port of the first switch, a virtual routing and forwarding instance corresponding to each port of the first switch, where all user-side ports of the first switch correspond to a first virtual routing and forwarding instance.

In this application, for a specific switch, all ports of the switch that have a same port attribute correspond to a same virtual routing and forwarding instance.

Step S630. The controller generates a forwarding table of the first switch according to a topology of the mesh network and the virtual routing and forwarding instance corresponding to each port of the first switch, where each forwarding entry of the forwarding table includes a virtual routing and forwarding instance, and a first forwarding entry of the forwarding table includes the first virtual routing and forwarding instance, a first destination network segment corresponding to the first virtual routing and forwarding instance and at least two forwarding paths corresponding to the first destination network segment.

Step S640. The controller sends the forwarding table to the first switch.

The forwarding table is used to enable the first switch to select, according to a load balancing algorithm and the first forwarding entry and from the at least two forwarding paths corresponding to the first destination network segment, a target forwarding path for a packet corresponding to the first destination network segment. The packet corresponding to the destination network segment is a packet whose destination IP address belongs to the destination network segment.

In one implementation of step S610, the port attribute is used to indicate that the port is a user-side port or a network-side port. In another implementation, the network-side port is an intra-group port or an inter-group port.

The first switch is any switch in the mesh network.

Figure 7:
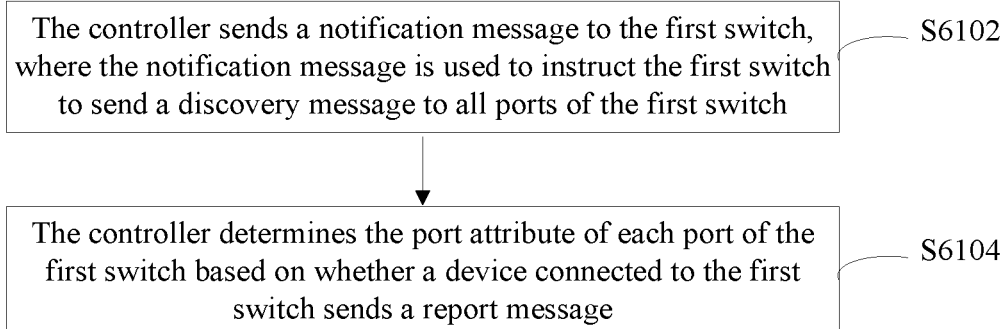
FIG. 7 is a flowchart of a specific implementation of step S610 shown in FIG. 6.

In one implementation, step S610 may include steps S6102 and S6104 shown in FIG. 7.

Step S6102. The controller sends a notification message to the first switch, where the notification message is used to instruct the first switch to send a discovery message from all ports of the first switch.

That the controller sends a notification message to the first switch may include that the controller sends the notification message to the first switch when detecting that the first switch and the controller are establishing a connection or after detecting that the first switch and the controller have established a connection.

As described above, all the ports are all service ports of the first switch, and do not include a management port through which the first switch is connected to the controller. The discovery message is used to instruct a device that receives the discovery message to send a report message to the controller. A device that is communicatively connected to a service port of the first switch receives the discovery message. A switch that receives the discovery message sends a report message to the controller. A server that receives the discovery message may or may not send a report message to the controller. Each report message includes a port number of a service port through which a sender of the report message communicates with the first switch. Further, the discovery message includes an identifier of the first switch and an identifier of a port through which the first switch sends the discovery message. The identifier of the first switch may be a number or a name of the first switch. The identifier of the port through which the first switch sends the discovery message may be a number or a name of the port.

FIG. 4 is used as an example. The controller 310 sends a notification message to the first switch, for example, the switch S1. After receiving the notification message, the switch S1 sends a discovery message D1 to all service ports S1.00, S1.01, S1.2, and S1.3 of the switch S1. The discovery message D1 sent to the service port S1.00 includes an identifier S1 of the switch S1 and an identifier of port 00 that sends the discovery message D1. If the device that is communicatively connected to the port 00 of the switch S1 is the server A1, the server A1 receives the discovery message D1 and then sends a report message R1 to the controller 310. The report message R1 includes the identifier S1 of the switch S1 and an identifier 00 of the port that sends the discovery message D1. The server A2 that is communicatively connected to the port S1.01 of the switch S1 receives a discovery message D2. The discovery message D2 includes the identifier S1 of the switch S1 and an identifier 01 of the port that sends the discovery message D2. The server A2 receives the discovery message D2 and then sends a report message R2 to the controller 310. The report message R2 includes the identifier S1 of the switch S1 and the identifier 01 of the port through which the switch S1 sends the discovery message D2. The discovery message may be a Link Layer Discovery Protocol (LLDP) message. The LLDP message may use different type-length-values (TLVs) to carry an identifier of a switch and an identifier of a port through which the switch sends a discovery message.

If the first switch device is connected to a second switch, the second switch receives the discovery message and then sends a report message to the controller 310. The report message is used to notify the controller 310 of a port through which the first switch sends the discovery message to the second switch. The second switch is any switch other than the first switch in the mesh network 320. The second switch usually directly sends the report message to the controller 310. If the first switch device is connected to a server, the server receives the discovery message and then may or may not send a report message to the controller 310. If the server sends the report message to the controller 310, the report message is used to notify the controller 310 of a port through which the first switch sends the discovery message to the server. The server may send the report message to the controller 310 through the first switch, or may directly send the report message to the controller 310.

Step S6104. The controller determines the port attribute of each port of the first switch based on whether a device connected to the first switch sends a report message.

In one implementation, the controller 310 receives the report message sent by the device connected to the first switch. The report message includes the identifier of the port through which the first switch sends the discovery message to the device, the identifier of the first switch, and an identifier of the device.

In an embodiment, the controller 310 may receive multiple report messages separately sent by multiple devices connected to the first switch. For ease of description, the following uses a processing procedure of one report message as an example to describe a specific implementation of this application. Other report messages are processed in a similar manner.

The controller 310 determines a type of the device according to the identifier of the device in the report message. The type of the device may be a switch or a server.

If the device is another switch, the controller 310 determines a port through which the first switch sends the discovery message to the other switch as a network-side port. If the device is a server, the controller 310 determines a port through which the first switch sends the discovery message to the server as a user-side port. Further, in a scenario in which the server does not send a report message to the controller 310, the controller 310 further determines, according to pre-obtained all ports of the first switch and report messages received by the controller 310, a port that is of the first switch and that is not reported, and determines the port that is not reported as a user-side port. The port that is not reported is a port that is not included in any report message. Further, the controller 310 may set a timer, start the timer after the controller 310 sends the notification message to the first switch, and determine a port that is of the first switch and that is still not reported after a specified time period as a user-side port.

In a level-2 mesh network scenario, a network-side port includes an intra-group port and an inter-group port. When the first switch and the second switch belong to different switch groups, the controller 310 determines a port through which the first switch is connected to the second switch as an inter-group port. When the first switch and the second switch belong to a same switch group, the controller 310 determines a port through which the first switch is connected to the second switch as an intra-group port. In one implementation, the controller 310 determines, according to the identifier of the first switch and an identifier of the second switch, whether the first switch and the second switch belong to a same switch group.

In one implementation of step S620, ports have a same port attribute correspond to a same virtual routing and forwarding instance. A virtual routing and forwarding technology allows multiple virtual routing and forwarding instances in a forwarding table. The multiple virtual routing and forwarding instances are independent of each other, and therefore same or overlapping IP addresses may be used in different virtual routing and forwarding instances of a same forwarding table and do not conflict with each other. A virtual routing and forwarding instance is a forwarding instance that uses the virtual routing and forwarding technology. In this application, different virtual routing and forwarding instances are used to separate forwarding entries corresponding to different types of ports to ensure that a packet received from a port is not sent back to the port. In a scenario in which the mesh network 320 is a level-1 mesh network, ports of the first switch include an intra-group port (network-side port) and a user-side port. The controller 310 may determine that all user-side ports correspond to one virtual routing and forwarding instance, and all intra-group ports (network-side ports) correspond to another virtual routing and forwarding instance. For example, based on the mesh network 3201 shown in FIG. 4, the controller 310 determines that the ports S1.0 and S2.0 correspond to virtual routing and forwarding instance (also referred as VRF) 1, and the ports S1.2, S1.3, S2.1, S2.3, S3.1 and S3.2 correspond to VRF 2.

In a scenario in which the mesh network 320 is a level-2 mesh network, ports of the first switch include an intra-group port, an inter-group port, and a user-side port. The controller 310 may determine that all user-side ports correspond to a first virtual routing and forwarding instance, all intra-group ports correspond to a second virtual routing and forwarding instance, and all inter-group ports correspond to a third virtual routing and forwarding instance. For example, based on the mesh network 3202 shown in FIG. 5, the switches S11, S12, and S13 in the first switch group are used as an example. Based on a port numbering rule described above, the controller 310 determines that the port S11.0 corresponds to VRF 3, intra-group ports S11.12, S11.13, S13.11, S13.12, S12.11, and S12.13 correspond to VRF 4, and inter-group ports S11.21, S11.31, S12.22, S12.32, S13.23, and S13.33 correspond to VRF 5.

In a specific implementation of step S630, each entry of the forwarding table includes a virtual routing and forwarding instance, a destination network segment corresponding to the virtual routing and forwarding instance, and at least one forwarding path corresponding to the destination network segment. A next hop in the forwarding table is generally used to indicate a forwarding path. The at least one forwarding path corresponding to the destination network segment includes at least one next hop corresponding to the destination network segment and an egress port corresponding to each next-hop in the at least one next hop in the forwarding table. When the virtual routing and forwarding instance is the first virtual routing and forwarding instance, the forwarding entry includes the destination network segment and the at least two forwarding paths corresponding to the destination network segment, that is, there are at least two next hops between the first virtual forwarding instance and the destination network segment. The at least two forwarding paths may be equal-cost paths or unequal-cost paths according to different routing rules. In this application, an identifier of a next-hop device is used to indicate a next hop. In one embodiment, a next hop in the forwarding table may be an IP address of a next-hop device. An egress port may also be referred to an outbound interface, and is a port that sends a packet when the packet is forwarded to a next-hop device.

In one implementation of step S630, when the first switch is a switch in the mesh network 3201 shown in FIG. 4, all network-side ports of the first switch correspond to a second virtual routing and forwarding instance. A forwarding entry corresponding to the second virtual routing and forwarding instance includes the second virtual routing and forwarding instance, a destination network segment corresponding to the second virtual routing and forwarding instance, and at least one forwarding path corresponding to the destination network segment.

In another implementation of step S630, when the first switch is a switch in the mesh network 3202 shown in FIG. 5, network-side ports of the first switch are further classified into intra-group ports and inter-group ports. All the intra-group ports correspond to a second virtual routing and forwarding instance, and all the inter-group ports correspond to a third virtual routing and forwarding instance. A forwarding entry corresponding to the second virtual routing and forwarding instance includes the second virtual routing and forwarding instance, a destination network segment corresponding to the second virtual routing and forwarding instance, and the at least one forwarding path corresponding to the destination network segment. A forwarding entry corresponding to the third virtual routing and forwarding instance includes the third virtual routing and forwarding instance, a destination network segment corresponding to the third virtual routing and forwarding instance, and the at least one forwarding path corresponding to the destination network segment.

In still another implementation of step S630, that the controller generates a forwarding table of the first switch according to a topology of the mesh network and the virtual routing and forwarding instance corresponding to each port of the first switch includes the following steps.

A. The controller obtains a network segment configured for each of multiple switches to obtain multiple network segments.

A network segment needs to be configured for a switch such that a server connected to the switch can access a network. Generally, different network segments are configured for different switches. The network segment can be configured by a network administrator or the controller.

In this application, when detecting that a new switch accesses the network, the controller obtains a network segment configured for the switch. Further, the controller generates a forwarding table for the new switch according to the network segment configured for the new switch and obtained network segments of other switches. FIG. 4 is used as an example. The controller 310 separately obtains network segments a segment 1, a segment 2, and a segment 3 allocated to the switches S1, S2, and S3. FIG. 5 is used as an example. The controller 310 separately obtains network segments a segment 11, a segment 12, a segment 13, a segment 21, a segment 22, a segment 23, a segment 31, a segment 32, and a segment 33 allocated to the switches S11, S12, S13, S21, S22, S23, S31, S32, and S33.

B. The controller determines a source network segment and a destination network segment in the multiple network segments. The source network segment is any one of the multiple network segments, and the destination network segment is any one of the multiple network segments except the source network segment.

The controller needs to calculate a forwarding table of each switch on an entire network. Therefore, the controller needs to combine all possible pairs of source and destination network segments. When the network includes n switches, a maximum quantity of source and destination network segment combinations may be n*(n−1). FIG. 4 is used as an example. The determined pairs of source and destination network segments may include {segment 1, segment 2}, {segment 1, segment 3}, {segment 2, segment 1}, {segment 2, segment 3}, {segment 3, segment 1}, and {segment 3, segment 2}. A maximum quantity of pairs of source and destination network segments based on FIG. 5 may be 72. Details are not provided herein.

C. The controller determines, according to the topology of the mesh network, N forwarding paths from the source network segment to the destination network segment, and generates a route entry corresponding to an $i^{th}$ forwarding path for each switch other than a destination switch on the $i^{th}$ forwarding path in the N forwarding paths, where i is a natural number less than or equal to N. Each route entry includes a virtual routing and forwarding instance, a destination network segment corresponding to the virtual routing and forwarding instance, a next hop, and an egress port.

The destination switch is a switch directly connected to a destination server and an IP address of the destination server belongs to the destination network segment. A virtual routing and forwarding instance in a route entry of a switch is a virtual routing and forwarding instance corresponding to a source port of the route entry.

Further, the controller determines N forwarding paths for each pair of source and target network segments according to the topology of the mesh network. FIG. 4 is used as an example. There are two forwarding paths between the segment 1 and the segment 2, S1→S2 and S1→S3→S2, that is, N=2. For the path S1→S2, S2 is a destination switch, the controller 310 generates a route entry for the switch S1, VRF of the route entry is VRF 1, a destination network segment is the segment 2, a next hop is S2, and an egress port is S1.2. For simplicity, the route entry is recorded as {VRF: 1, destination network segment: segment 2, next hop: S2, egress port: S1.2}. For the path S1→S3→S2, the controller 310 generates a route entry {VRF: 1, destination network segment: segment 3, next hop: S3, egress port: S1.3} for the switch S1, and generates a route entry {VRF: 2, destination network segment: segment 2, next hop: S2, egress port: S3.2} for S3. The controller 310 generates a route entry for each switch according to a forwarding path corresponding to other source and target network segments in a similar process. FIG. 9A shows route entries generated by the controller for each switch based on the mesh network shown in FIG. 4.

D. The controller determines, according to all route entries of the first switch, a forwarding path corresponding to each destination network segment of the first switch in each virtual routing and forwarding instance to generate the forwarding table of the first switch.

The controller may determine all route entries generated for each switch, and then combine all the route entries of each switch according to virtual routing and forwarding instances and destination network segments to generate a forwarding table of the switch. Combining may include first determining all route entries corresponding to each virtual routing and forwarding instance, and then combining route entries that have a same destination network segment in all the route entries corresponding to each virtual routing and forwarding instance. The combining route entries that have a same destination network segment in all the route entries corresponding to each virtual routing and forwarding instance includes, if a destination address corresponds to multiple route entries, combining the multiple route entries into one, if the destination address corresponds to one route entry, retaining the route entry. For example, the controller may separately determine route entries generated for the switches S1, S2, and S3 according to FIG. 9A, and then generate one forwarding entry according to a route entry corresponding to each destination network segment related to same VRF to finally obtain three forwarding tables shown in FIG. 9B, FIG. 9C, and FIG. 9D. In the forwarding tables shown in FIG. 9B, FIG. 9C, and FIG. 9D, each destination network segment related to VRF 1 corresponds to multiple forwarding paths, while each destination network segment related to VRF 2 corresponds to one forwarding path. In a large-scale network scenario, each destination network segment related to VRF 2 may correspond to multiple forwarding paths.

The following further uses FIG. 5 as an example to describe a process in which the controller generates a forwarding entry according to source and destination network segments. It is assumed that an IP address of a server AA is IPa and belongs to a network segment a, and an IP address of a server B is IPb and belongs to a network segment b. For the segment a and the segment b, the controller 310 may determine that the following four non-intersecting forwarding paths exist between the server AA and the server BB according to the topology of the mesh network in FIG. 5.

Path 1: server AA→S11→S12→S22→server BB;
Path 2: server AA→S11→S21→S22→server BB;
Path 3: server AA→S11→S13→S23→S22→server BB; and
Path 4: server AA→S11→S31→S32→S22→server BB.

Figures 10F, 10G, 11:
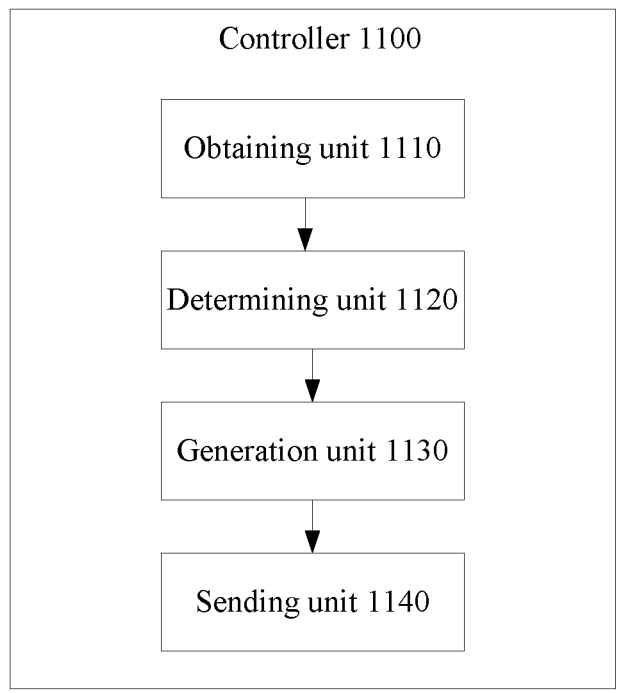

FIG. 10A to FIG. 10G show forwarding entries separately generated by the controller 310 for the switches S11, S12, S21, S13, S23, S31, and S32 according to the source network segment a and the destination network segment b and according to the foregoing steps A to D. It can be learned that in the scenario shown in FIG. 5, there are multiple forwarding paths for a packet received from a user-side port (corresponding to VRF 3) (FIG. 10A shows four paths, and the quantity varies with a quantity of switches included in a switch group that contains the switch and a quantity of level-1 mesh networks included in the level-2 mesh network), and there is only one forwarding path for a packet received from an intra-group port (a network-side port corresponding to VRF 4) or an inter-group port (a network-side port corresponding to VRF 5).

The foregoing description uses an example in which the controller generates and sends the forwarding table for the first switch to describe the technical solutions in this application. In actual operations, the controller needs to generate a corresponding forwarding table for each switch in the mesh network according to the topology of the mesh network, and sends the forwarding table to the corresponding switch.

In the foregoing manner, the controller generates and sends the forwarding table for each switch. A virtual routing and forwarding instance is used to distinguish packets from a user-side port or a network-side port in the forwarding table. There are at least two forwarding paths between a virtual routing and forwarding instance corresponding to the user-side port and each destination network segment. In this way, when the switch forwards, according to the forwarding table, a packet destined for a destination network segment, load balancing can be implemented between the at least two paths.

Figure 8:
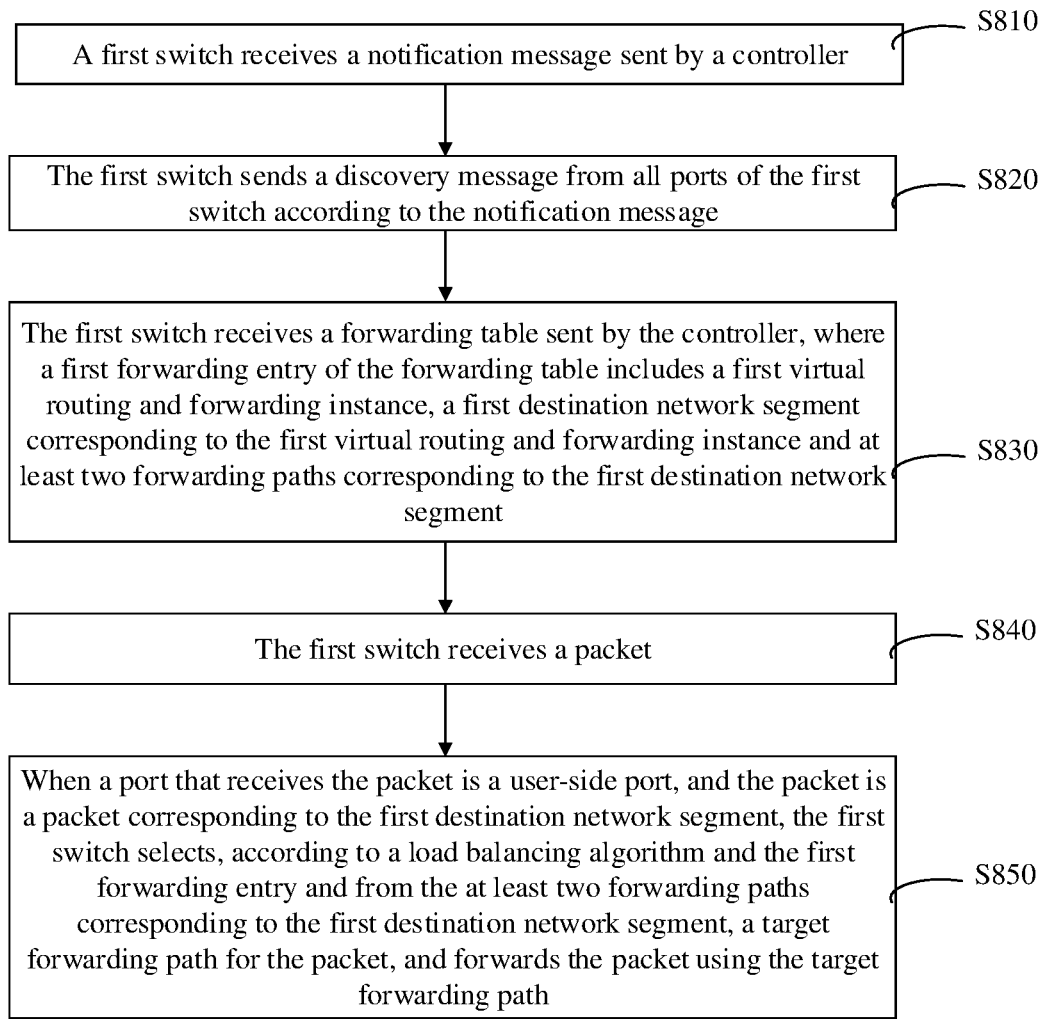
FIG. 8 is a schematic flowchart of a method for obtaining a forwarding table according to an embodiment of this application.

Based on the network system in any one of FIG. 3 to FIG. 5, an embodiment of this application further provides a method for implementing load balancing shown in FIG. 8. This method is executed by the first switch (any switch in the mesh network) in the mesh network 320.

Step S810. The first switch receives a notification message sent by a controller.

Step S820. The first switch sends a discovery message from all ports of the first switch according to the notification message.

For details about the notification message and the discovery message, refer to related descriptions of step S6102.

The steps S810 and S820 are optional.

If the steps S810 and S820 are not required, in an alternative implementation, the first switch may actively detect a port attribute of each port of the first switch, and send the detected port attribute of each port to the controller. For example, the first switch determines a port through which the first switch is connected to another device, monitors an LLDP message received by each port connected to another device, and determines a type of the device according to an identifier of the device carried in the received LLDP message. If the type of the device is a server, the first switch determines the port that receives the LLDP message as a user-side port. If the type of the device is a switch and the device and the first switch belong to a same switch group, the first switch determines the port that receives the LLDP message as an intra-group port. If the type of the device is a switch and the device and the first switch belong to different switch groups, the first switch determines the port that receives the LLDP message as an inter-group port. Further, the first switch determines a port that is connected to another device but does not receive an LLDP message after a specified time period as a user-side port.

In one implementation, the first switch may further receive a second discovery message sent by a second switch. The second discovery message includes an identifier of the second switch and an identifier of a port through which the second switch sends the second discovery message to the first switch. The first switch sends a second report message to the controller according to the second discovery message. The second report message includes the identifier of the port through which the second switch sends the second discovery message to the first switch such that the controller determines a port attribute of the port through which the second switch sends the second discovery message to the first switch.

Step S830. The first switch receives a forwarding table sent by the controller, where a first forwarding entry of the forwarding table includes a first virtual routing and forwarding instance, a first destination network segment corresponding to the first virtual routing and forwarding instance and at least two forwarding paths corresponding to the first destination network segment, and the first virtual routing and forwarding instance is a virtual routing and forwarding instance corresponding to all user-side ports of the first switch. The first destination network segment is any network segment other than a network segment configured for the first switch.

As described above, the forwarding table is generated by the controller according to a topology of the mesh network and a virtual routing and forwarding instance corresponding to each port of the first switch. For details about a structure of the forwarding table, refer to the foregoing descriptions of FIG. 9A, FIG. 9B, and FIG. 9C.

Step S840. The first switch receives a packet.

Step S850. When a port that receives the packet is a user-side port, and the packet is a packet corresponding to the first destination network segment, the first switch selects, according to a load balancing algorithm and the first forwarding entry, a target forwarding path for the packet from the at least two forwarding paths corresponding to the first destination network segment, and forwards the packet using the target forwarding path.

The packet corresponding to the first destination network segment is a packet whose IP address belongs to the first destination network segment.

The load balancing algorithm may be preconfigured by the controller or an administrator on the first switch.

In this application, the first switch also needs to obtain a correspondence between a port attribute and a virtual routing and forwarding instance. Further, the first switch may receive a correspondence between a port attribute and a virtual routing and forwarding instance that is sent by the controller, or receive a correspondence between a port attribute and a virtual routing and forwarding instance that is configured by a network administrator.

In one implementation, the first switch receives the packet and determines a port attribute of a port that receives the packet to obtain a corresponding virtual routing and forwarding instance. Then, the first switch searches the forwarding table according to the virtual routing and forwarding instance and a destination IP address of the packet to obtain a forwarding entry corresponding to the virtual routing and forwarding instance and a destination network segment to which the destination IP address belongs, and forwards the packet according to the forwarding entry. Further, when the port that receives the packet is a user-side port, the first switch selects, according to the load balancing algorithm, a target forwarding path for the packet from the at least two forwarding paths related to the forwarding entry corresponding to the first virtual routing and forwarding instance and the destination network segment to which the destination IP address of the packet belongs, and forwards the packet using the target forwarding path.

It can be learned that using the method provided by the embodiment of this application, load balancing can be implemented for equal-cost or unequal-cost paths in the mesh network when the switch sends the packet. In addition, each virtual routing and forwarding instance has indicated a source port of the packet. Therefore, when the controller generates the forwarding table, the switch to which a source port sending a packet belongs is not used as a next hop of a forwarding path. This avoids a loop on the mesh network.

To execute the method for implementing load balancing shown in FIG. 6 and FIG. 7, an embodiment of this application further provides a controller 1100. As shown in FIG. 11, the controller 1100 includes an obtaining unit 1110, a determining unit 1120, a generation unit 1130, and a sending unit 1140. The obtaining unit 1110 is configured to execute step S610 and its various implementations. The determining unit 1120 is configured to execute step S620 and its various implementations. The generation unit 1130 is configured to execute step S630 and its various implementations. The sending unit 1140 is configured to execute step S640 and its various implementations.

In this application, division of function units in the controller 1100 in FIG. 11 is merely an example. A person skilled in the art may combine the function units in FIG. 11 to obtain a larger function unit or may divide a function unit to obtain multiple smaller function units based on descriptions of the methods shown in FIG. 6 and FIG. 7. For example, the obtaining unit 1110 may be divided into multiple subunits based on actions that need to be executed by the controller 1100.

Figure 12:
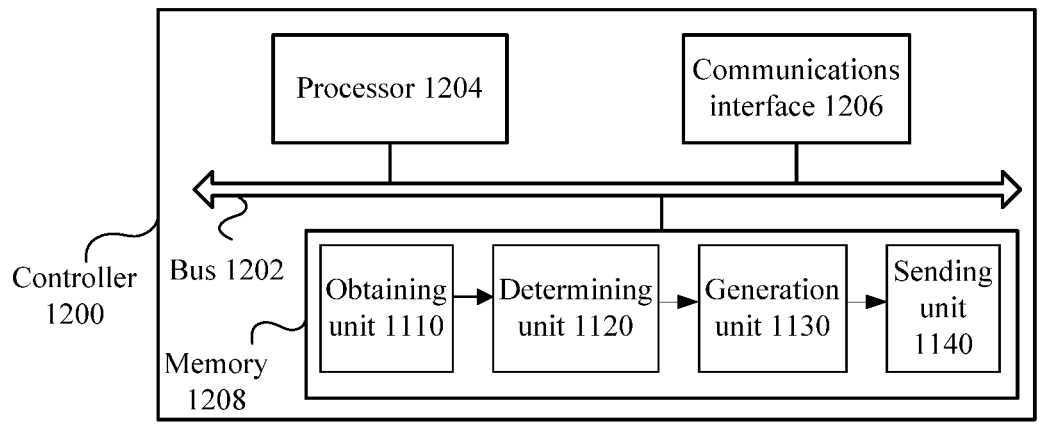
FIG. 12 is a schematic diagram of a structure of another controller according to an embodiment of this application.

In one implementation, the function units in the controller 1100 may be further software modules deployed on the controller 1200 shown in FIG. 12. As shown in FIG. 12, the controller 1200 includes a bus 1202, a processor 1204, a memory 1208, and a communications interface 1206. The processor 1204, the memory 1208, and the communications interface 1206 communicate with each other through the bus 1202.

The processor 1204 may be a central processing unit (CPU). The memory 1208 may include a volatile memory, for example, a RAM. The memory 1208 may also include a nonvolatile memory, for example, a ROM, a flash memory, a HDD, or a SSD.

The communications interface 1206 is configured to communicate with another device. The communications interface 1206 may include multiple ports. Each port is configured to communicate with a device controlled by the controller 1200, and the device may be a switch or a server.

The memory 1208 is configured to store program code. The program code includes at least a program module or a computer instruction that can implement functions of the obtaining unit 1110, the determining unit 1120, the generation unit 1130, and the sending unit 1140 shown in FIG. 11.

The processor 1204 is configured to invoke the program code in the memory 1208 to implement the method shown in FIG. 6 or FIG. 7.

Figure 13:
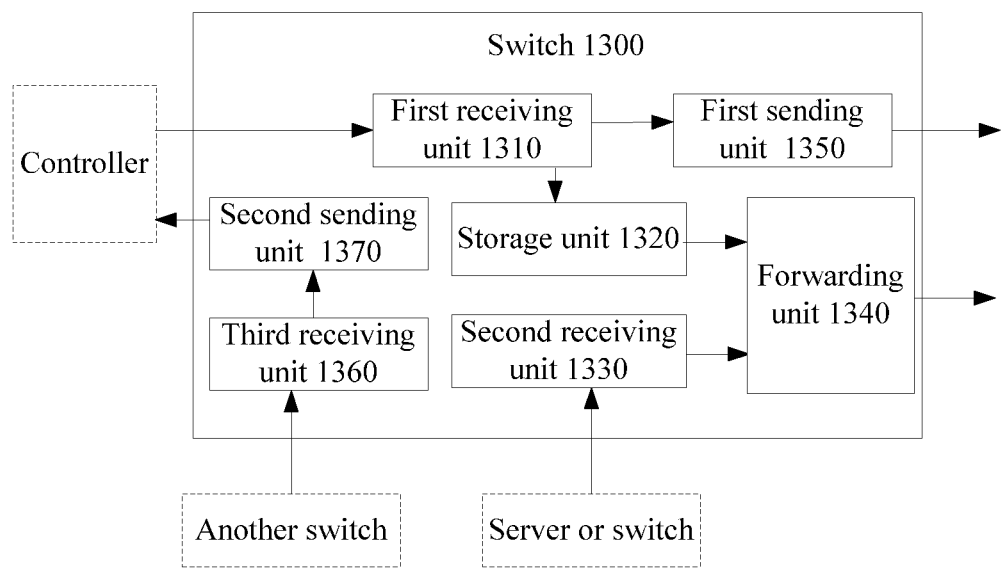
FIG. 13 is a schematic diagram of a structure of a switch according to an embodiment of this application.

To implement the method for implementing load balancing shown in FIG. 8, an embodiment of this application further provides a switch 1300, that is, the first switch in FIG. 8. As shown in FIG. 13, the switch 1300 includes a first receiving unit 1310 configured to execute step S830 and its various implementations, a second receiving unit 1330 configured to execute step S840, and a forwarding unit 1340 configured to execute step S850.

In one implementation, the first receiving unit 1310 is further configured to execute step S810. In this case, the switch 1300 further includes a first sending unit 1350 that is configured to execute step S820.

In another implementation, the switch 1300 further includes a third receiving unit 1360 and a second sending unit 1370. The third receiving unit 1360 is configured to receive a second discovery message sent by another switch. The second discovery message includes an identifier of the other switch and an identifier of a port through which the other switch sends the second discovery message to the switch 1300. The second sending unit 1370 is configured to send a second report message to the controller according to the second discovery message. The second report message includes the identifier of the port through which the other switch sends the second discovery message to the switch 1300 such that the controller determines a port attribute of the port through which the other switch sends the second discovery message to the switch 1300.

In another implementation, the switch 1300 further includes a storage unit 1320 that is configured to store a forwarding table. Correspondingly, the forwarding unit 1340 is configured to select a target forwarding path according to the forwarding table stored in the storage unit 1320 and a load balancing algorithm.

When a network-side port includes an intra-group port and an inter-group port, all intra-group ports of the switch correspond to a second virtual routing and forwarding instance. A forwarding entry, in the forwarding table, corresponding to the second virtual routing and forwarding instance includes the second virtual routing and forwarding instance, a destination network segment, and at least one forwarding path corresponding to the destination network segment. All inter-group ports of the switch correspond to a third virtual routing and forwarding instance. A forwarding entry, in the forwarding table, corresponding to the third virtual routing and forwarding instance includes the third virtual routing and forwarding instance, a destination network segment, and at least one forwarding path corresponding to the destination network segment.

In addition to the foregoing function units, the switch 1300 further includes multiple ports. The multiple ports are configured to send or receive messages in collaboration with the first receiving unit 1310, the second receiving unit 1330, the first sending unit 1350, the third receiving unit 1360, or the second sending unit 1370.

In this application, division of function units in the switch 1300 in FIG. 13 is merely an example. A person skilled in the art may combine the function units in FIG. 13 to obtain a larger function unit or may divide a function unit to obtain multiple smaller function units based on descriptions of the method shown in FIG. 8. For example, the first receiving unit 1310 and the second sending unit 1370 may be combined into one controller communications unit.

Figure 14:
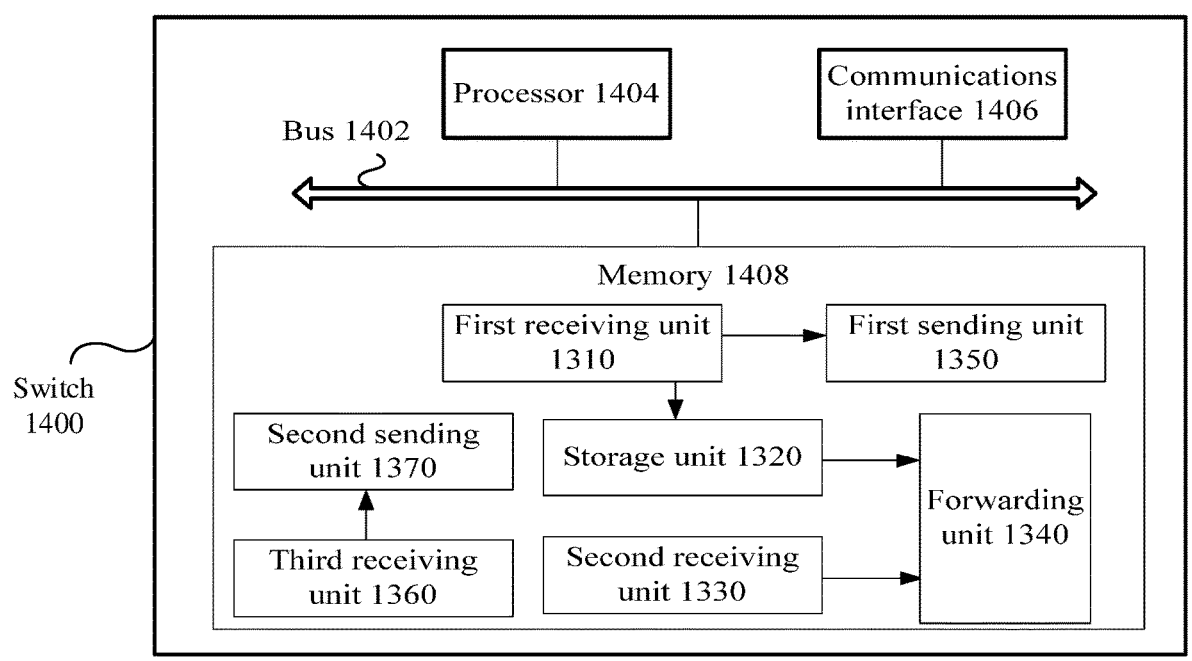
FIG. 14 is a schematic diagram of a structure of another switch according to an embodiment of this application.

In one implementation, the function units in the switch 1300 may include software modules deployed on the switch 1400 shown in FIG. 14. As shown in FIG. 14, the switch 1400 includes a bus 1402, a processor 1404, a memory 1408, and a communications interface 1406. The processor 1404, the memory 1408, and the communications interface 1406 communicate with each other through the bus 1402.

The processor 1404 may be a CPU. The memory 1408 may include a volatile memory, for example, a RAM. The memory 1408 may also include a nonvolatile memory, for example, a ROM, a flash memory, an HDD, or a SSD.

The communications interface 1406 is configured to communicate with another device. The communications interface 1406 may include multiple ports during actual deployment. Each port is configured to communicate with a device, and the device may be a server or another switch. When the port is a management port, the device may be a controller.

The memory 1408 is configured to store program code. The program code includes at least a program module or a computer instruction that can implement functions of the units shown in FIG. 13.

The processor 1404 is configured to invoke the program code in the memory 1408 to implement the method shown in FIG. 8.

A person of ordinary skill in the art may understand that all or some of the steps of the method embodiments may be implemented by a computer program instructing related hardware. The program may be stored in a computer-readable storage medium. When the program is executed, the related hardware completes steps of the methods described in the foregoing embodiments. The foregoing storage medium includes any medium that can store program code, such as a ROM, a RAM, a magnetic disk, or an optical disc. Correspondingly, an embodiment of this application further provides a computer program product, where the computer program product includes instructions for executing operations in the foregoing method embodiments.

Correspondingly, an embodiment of this application further provides a storage medium, where the storage medium is configured to store the computer program product.

The foregoing descriptions are merely preferred implementations of this application. It should be noted that a person of ordinary skill in the art may make several improvements or polishing without departing from the principle of this application and the improvements or polishing shall fall within the protection scope of this application.

What is claimed is:

1. A method for implementing load balancing implemented by a system comprising a controller and a mesh network, wherein the mesh network comprises a plurality of switches, wherein the switches are inter-connected to each other within the mesh network, and wherein the method comprises:

obtaining, by the controller, a port attribute of each port of a first switch in the mesh network, wherein the port attribute of each port indicates whether the port is a user-side port or a network-side port, wherein the user-side port is a port configured to couple to a server, and wherein the network-side port is a port configured to couple to another switch in the mesh network;

determining, by the controller according to the port attribute of each port of the first switch, a virtual routing and forwarding instance corresponding to each port of the first switch, wherein all user-side ports of the first switch correspond to a first virtual routing and forwarding instance, and wherein all network-side ports of the first switch correspond to a second virtual routing and forwarding instance that is different than the first virtual routing and forwarding instance;

generating, by the controller, a forwarding table of the first switch according to a topology of the mesh network and the virtual routing and forwarding instance corresponding to each port of the first switch, wherein a first forwarding entry of the forwarding table comprises the first virtual routing and forwarding instance corresponding to all user-side ports of the first switch, a first destination network segment corresponding to the first virtual routing and forwarding instance, and at least two forwarding paths corresponding to the first destination network segment; and sending, by the controller, the forwarding table to the first switch, wherein the forwarding table enables the first switch to select, according to a load balancing algorithm and the first forwarding entry and from the at least two forwarding paths corresponding to the first destination network segment, a target forwarding path for a packet corresponding to the first destination network segment.

2. The method of claim 1, wherein obtaining the port attribute of each port of the first switch comprises:
   sending, by the controller, a notification message to the first switch instructing the first switch to send a discovery message from all ports of the first switch, wherein the discovery message instructs a device receiving the discovery message to send a report message to the controller; and
   determining, by the controller, the port attribute of each port of the first switch based on whether a device coupled to each port of the first switch sends the report message.

3. The method of claim 2, wherein determining the port attribute of each port of the first switch comprises:
   receiving, by the controller, the report message comprising a type of the device sending the report message and an identifier of a port through which the first switch sends the discovery message to the device;
   determining, by the controller, the type of the device sending the report message;
   determining, by the controller, a port through which the first switch sends the discovery message to another switch as the network-side port when the device sending the report message comprises the other switch; and
   determining, by the controller, a port through which the first switch sends the discovery message to the server as the user-side port when the device sending the report message comprises the server.

4. The method of claim 3, wherein after sending the notification message to the first switch, the method further comprises determining, by the controller, a port on the first switch that is not reported within a specified time period as the user-side port.

5. The method of claim 4, wherein the mesh network comprises a level-2 mesh network, and wherein determining the port through which the first switch sends the discover message to the other switch as the network-side port comprising one of:
   determining, by the controller, the port through which the first switch sends the discovery message to the other switch as an intra-group port when the first switch and the other switch belong to a same switch group; and
   determining, by the controller, the port through which the first switch sends the discovery message to the other switch as an inter-group port when the first switch and the other switch belong to different switch groups.

6. The method of claim 5, wherein all intra-group ports of the first switch correspond to a second virtual routing and forwarding instance, wherein a second forwarding entry in the forwarding table corresponds to the second virtual routing and forwarding instance comprising the second virtual routing and forwarding instance, a second destination network segment, and at least one forwarding path corresponding to the second destination network segment, wherein all inter-group ports of the first switch correspond to a third virtual routing and forwarding instance, and wherein a third forwarding entry in the forwarding table corresponds to the third virtual routing and forwarding instance comprising the third virtual routing and forwarding instance, a third destination network segment, and at least one forwarding path corresponding to the third destination network segment.

7. The method of claim 1, wherein generating the forwarding table of the first switch comprises:
   obtaining, by the controller, a network segment configured for each of the switches to obtain a plurality of network segments;
   determining, by the controller, a source network segment and a second destination network segment in the network segments, wherein the source network segment comprises any one of the network segments, and wherein the second destination network segment comprises any one of the network segments except the source network segment;
   determining, by the controller according to the topology of the mesh network, N forwarding paths from the source network segment to the second destination network segment;
   generating, by the controller, a route entry corresponding to an $i^{th}$ forwarding path for each switch other than a destination switch on the $i^{th}$ forwarding path in the N forwarding paths, wherein each route entry comprises a respective virtual routing and forwarding instance, a respective destination network segment, a next hop, and an egress port, and wherein i comprises a natural number less than or equal to N; and
   determining, by the controller according to all route entries of the first switch, a forwarding path corresponding to each respective destination network segment of the first switch in each respective virtual routing and forwarding instance to generate the forwarding table of the first switch.

8. A method for implementing load balancing implemented by a system comprising a controller and a mesh network, wherein the mesh network comprises a plurality of switches, wherein the switches are inter-connected to each other within the mesh network, and wherein the method comprises:

receiving, by a first switch of the plurality of switches, a forwarding table from the controller, wherein the first switch comprises a plurality of ports, wherein the ports comprise a network-side port configured to couple to a server and a user-side port configured to couple to another switch in the mesh network, wherein all user-side ports of the first switch correspond to a first virtual routing and forwarding instance, wherein all network-side ports of the first switch correspond to a second virtual routing and forwarding instance that is different than the first virtual routing and forwarding instance, wherein a first forwarding entry of the forwarding table comprises the first virtual routing and forwarding instance, a first destination network segment corresponding to the first virtual routing and forwarding instance, and at least two forwarding paths corresponding to the first destination network segment;

receiving, by the first switch, a packet; and selecting, by the first switch according to a load balancing algorithm and the first forwarding entry, a target forwarding path for the packet from the at least two forwarding paths corresponding to the first destination network segment in response to a port receiving the packet corresponding to the first destination network segment comprising the user-side port; and forwarding, by the first switch, the packet using the target forwarding path.

9. The method of claim 8, wherein before receiving the forwarding table, the method further comprises:

receiving, by the first switch, a notification message from the controller; and sending, by the first switch, a discovery message from all ports of the first switch according to the notification message, wherein the discovery message instructs a device that receives the discovery message to send a report message to the controller.

10. The method of claim 9, further comprising:

receiving, by the first switch, a second discovery message from a second switch, wherein the second discovery message comprises an identifier of the second switch and an identifier of a port through which the second switch sends the second discovery message to the first switch; and sending, by the first switch, a second report message to the controller according to the second discovery message to enable the controller to determine a port attribute of the port through which the second switch sends the second discovery message to the first switch, wherein the second report message comprises the identifier of the port through which the second switch sends the second discovery message to the first switch.

11. The method of claim 8, wherein the network-side port comprises an intra-group port and an inter-group port, wherein all intra-group ports of the first switch correspond to a second virtual routing and forwarding instance, wherein a second forwarding entry in the forwarding table corresponds to the second virtual routing and forwarding instance comprising the second virtual routing and forwarding instance, a second destination network segment, and at least one forwarding path corresponding to the second destination network segment, wherein all inter-group ports of the first switch correspond to a third virtual routing and forwarding instance, and wherein a third forwarding entry in the forwarding table corresponds to the third virtual routing and forwarding instance comprising the third virtual routing and forwarding instance, a third destination network segment, and at least one forwarding path corresponding to the third destination network segment.

12. A controller comprising:

a processor; and a memory coupled to the processor and storing program instructions that, when executed by the processor, cause the controller to:

obtain a port attribute of each port of a first switch of a plurality of switches of a mesh network, wherein the switches are inter-connected to each other within the mesh network, wherein the port attribute of each port of the first switch indicates whether the port is a user-side port or a network-side port, wherein the user-side port is a port configured to couple to a server, and wherein the network-side port is a port configured to couple to another switch in the mesh network;

determine, according to the port attribute of each port of the first switch, a virtual routing and forwarding instance corresponding to each port of the first switch, wherein user-side ports of the first switch correspond to a first virtual routing and forwarding instance, and wherein all network-side ports correspond to a second virtual routing and forwarding instance that is different than the first virtual routing and forwarding instance;

generate a forwarding table of the first switch according to a topology of the mesh network and the virtual routing and forwarding instance corresponding to each port of the first switch, wherein a first forwarding entry of the forwarding table comprises the first virtual routing and forwarding instance corresponding to all user-side ports of the first switch, a first destination network segment corresponding to the first virtual routing and forwarding instance, and at least two forwarding paths corresponding to the first destination network segment; and send the forwarding table to the first switch, wherein the forwarding table enables the first switch to select, according to a load balancing algorithm and the first forwarding entry and from the at least two forwarding paths corresponding to the first destination network segment, a target forwarding path for a packet corresponding to the first destination network segment.

13. The controller of claim 12, wherein the program instructions further cause the controller to be configured to:

send a notification message to the first switch, wherein the notification message instructs the first switch to send a discovery message from all ports of the first switch, and wherein the discovery message instructs a device receiving the discovery message to send a report message to the controller; and determine the port attribute of each port of the first switch based on whether a device coupled to each port of the first switch sends the report message.

14. The controller of claim 13, wherein when determining the port attribute of each port of the first switch, the program instructions further cause the controller to be configured to:

receive the report message comprising a type of the device sending the report message and an identifier of a port through which the first switch sends the discovery message to the device;

determine the type of the device;

determine a port through which the first switch sends the discovery message to another switch as the network-side port when the device comprises the other switch; and determine a port through which the first switch sends the discovery message to the server as the user-side port when the device comprises the server.

15. The controller of claim 14, wherein after sending the notification message to the first switch the program instructions further cause the controller to be configured to determine a port that is on the first switch and that is not reported within a specified time period as the user-side port.

16. The controller of claim 15, wherein the mesh network comprises a level-2 mesh network, and when determining the port through which the first switch sends the discovery message to the other switch as the network-side port, the program instructions further cause the controller to be configured to:

determine the port through which the first switch sends the discovery message to the other switch as an intra-group port when the first switch and the other switch belong to a same switch group; and determine the port through which the first switch sends the discovery message to the other switch as an inter-group port when the first switch and the other switch belong to different switch groups.

17. The controller of claim 12, wherein the program instructions further cause the controller to be configured to:

obtain a network segment configured for each of the switches to obtain a plurality of network segments;

determine a source network segment and a second destination network segment in the network segments, wherein the source network segment comprises any one of the network segments, and wherein the second destination network segment comprises any one of the network segments except the source network segment;

determine, according to the topology of the mesh network, N forwarding paths from the source network segment to the second destination network segment;

generate a route entry corresponding to an $i^{th}$ forwarding path for each switch other than a destination switch on the $i^{th}$ forwarding path in the N forwarding paths, wherein each route entry comprises a respective virtual routing and forwarding instance, a respective destination network segment, a next hop, and an egress port, and wherein i comprises a natural number less than or equal to N; and determine, according to all route entries of the first switch, a forwarding path corresponding to each respective destination network segment of the first switch in each respective virtual routing and forwarding instance to generate the forwarding table of the first switch.

18. A switch applied to a system comprising a controller and a mesh network, comprising:

a plurality of ports comprising a network-side port configured to couple to a server and a user-side port configured to couple to another switch in the mesh network;

a processor coupled to the plurality of ports; and a memory coupled to the processor and storing program instructions that, when executed by the processor, cause the switch to:

receive a forwarding table from the controller, wherein all user-side ports of the first switch correspond to a first virtual routing and forwarding instance, wherein all network-side ports of the first switch correspond to a second virtual routing and forwarding instance that is different than the first virtual routing and forwarding instance, wherein a first forwarding entry of the forwarding table comprises the first virtual routing and forwarding instance, wherein the mesh network comprises a plurality of switches comprising the switch, wherein the switches are inter-connected to each other within the mesh network, wherein a first destination network segment corresponds to the first virtual routing and forwarding instance and at least two forwarding paths;

receive a packet;

select, according to a load balancing algorithm and the first forwarding entry, a target forwarding path for the packet from the at least two forwarding paths corresponding to the first destination network segment; and forward, using the target forwarding path, the packet when a port receiving the packet corresponding to the first destination network segment comprises a user-side port.

19. The switch of claim 18, wherein the program instructions further cause the switch to be configured to:

receive a notification message from the controller; and send a discovery message from all ports of the switch according to the notification message instructing a device receiving the discovery message to send a report message to the controller.

20. The switch of claim 19, wherein the program instructions further cause the switch to be configured to:

receive a second discovery message from another switch, wherein the second discovery message comprises an identifier of the other switch and an identifier of a port through which the other switch sends the second discovery message to the switch; and send a second report message to the controller to enable the controller to determine a port attribute of the port through which the other switch sends the second discovery message to the switch according to the second discovery message, wherein the second report message comprises the identifier of the port through which the other switch sends the second discovery message to the switch.

* * * * *